United States Patent
Kim

[19]
[11] Patent Number: 5,903,256
[45] Date of Patent: May 11, 1999

[54] METHOD AND APPARATUS FOR PERFORMING A MEMO FUNCTION IN A DISPLAY SYSTEM

[75] Inventor: Dong-Kyun Kim, Suwon, Rep. of Korea

[73] Assignee: SamSung Electronics Co., Ltd., Kyungki-do, Rep. of Korea

[21] Appl. No.: 07/870,903

[22] Filed: Apr. 20, 1992

[30] Foreign Application Priority Data

Jun. 19, 1991 [KR] Rep. of Korea ............ 91-10202

[51] Int. Cl.⁶ ............................................ G09G 5/08
[52] U.S. Cl. .................... 345/157; 345/158; 345/145; 345/169
[58] Field of Search ........................ 340/709, 706, 340/711, 721; 358/194.1; 345/158, 157, 156, 160, 162, 168, 169, 163, 161, 145, 146; 348/734

[56] References Cited

U.S. PATENT DOCUMENTS

| 4,624,587 | 11/1986 | Ueno et al. .................. 340/709 |
| 4,712,105 | 12/1987 | Köhler ......................... 358/194.1 |
| 4,812,832 | 3/1989 | Oishi et al. ................... 340/709 |
| 4,959,720 | 9/1990 | Duffield et al. ............... 358/191.1 |
| 4,959,721 | 9/1990 | Micic et al. .................. 358/194.1 |
| 5,093,726 | 3/1992 | Chun ........................... 358/194.1 |
| 5,146,210 | 9/1992 | Heberle ........................ 340/706 |
| 5,157,496 | 10/1992 | Kurosawa ....................... 358/194.1 |

*Primary Examiner*—Xiao Wu
*Attorney, Agent, or Firm*—Robert E. Bushnell, Esq.

[57] ABSTRACT

A method and apparatus for performing a memo function in a display system. A memo menu screen is displayed on a display system with an on-screen display (OSD) function when a menu key is selected, and input key is checked. Character or numeral data corresponding character or numeral key is displayed on a screen when the input key is judged to be the character key or the numeral key, and a cursor is shifted and returned to a right side or to a next line of the screen when the input key data is judged to be space or return key. A memo data stored in a memory is read out and displayed when the input key data is judged to be a read key, and a displayed memo data is stored in the memory when the input key data is judged to be a store key. Therefore, character or numeral data can be displayed on the screen and stored in the memory by selecting a corresponding key. Further, a function of the display system can be improved.

8 Claims, 3 Drawing Sheets

METHOD AND APPARATUS FOR PERFORMING A MEMO FUNCTION IN A DISPLAY SYSTEM

BACKGROUND OF THE INVENTION

The present invention relates to a method for performing a memo function in a display system, and more particularly to a method for performing a memo function in response to an input of key data in a system having an on-screen display function.

In a display system such as monitors of a television (TV), a video tape recorder (VTR) and the like, an on-screen display (OSD) control function for displaying a character, numeral, etc. on a visual screen is used. However, in the case that a user is in need of a memo during watching a TV with the OSD function, the user must manually write the desired memo every time. In other words, even if a conventional TV has the OSD function, only a message for a TV operation, etc. is displayed, and a character or numeral in response to a key input of a user can not be displayed.

SUMMARY OF THE INVENTION

It is therefore an object of the current invention to provide an improved method and apparatus for displaying a character or numeral in response to a key input of a user on a screen in a display system with an OSD function, and simultaneously storing the character or numeral in a memory.

According to an aspect of the current present invention, a memo menu screen is displayed on a screen when the menu key is selected, and input key is checked. Character or numeral data corresponding character or numeral key is displayed on the screen when the input key is judged to be the character key or the numeral key, and a cursor is shifted and returned to a right side or to a next line of the screen when the input key data is judged to be space or return key. A memo data stored in a memory is read out and displayed when the input key data is judged to be a read key, and a displayed memo data is stored in the memory when the input key data is judged to be a store key.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

Figure 1:
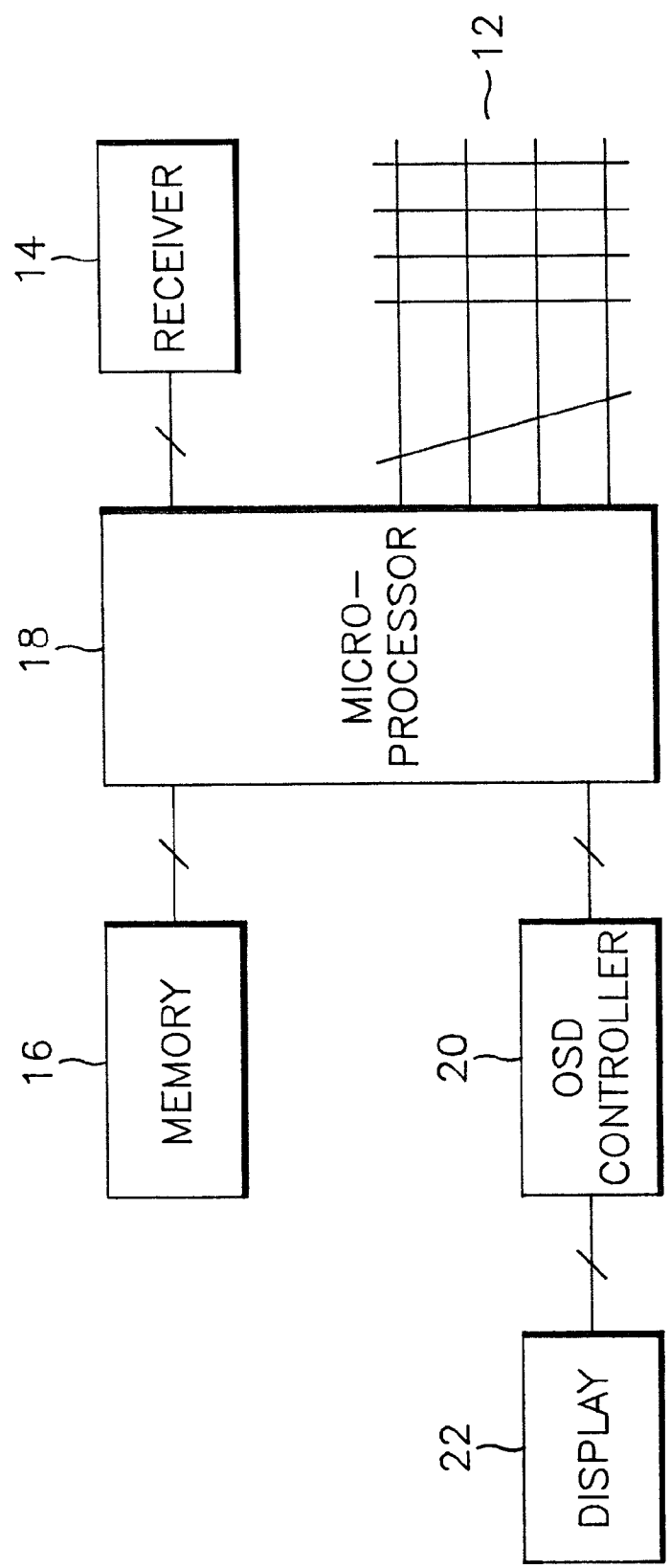
FIG. 1 is a portion block diagram of a display system applied to one embodiment of the present invention.

Referring to FIG. 1, a key matrix 12 has character and numeral keys, and generates key data corresponding to a depressed key. A remote controller receiver 14 receives a remote control signal generated from a remote controller (not shown) to generate the remote control signal as an electrical signal, and a memory 16 stores input data and produces stored data in response to a given control. A microprocessor 18 checks input key data on the basis of a given program stored therein, and controls the memory 16 and a display in response to an input key. An OSD controller 20 generates OSD data in response to the display control of the microprocessor 18, and a display unit 22 displays the OSD data produced from the OSD controller 20.

Figure 2:
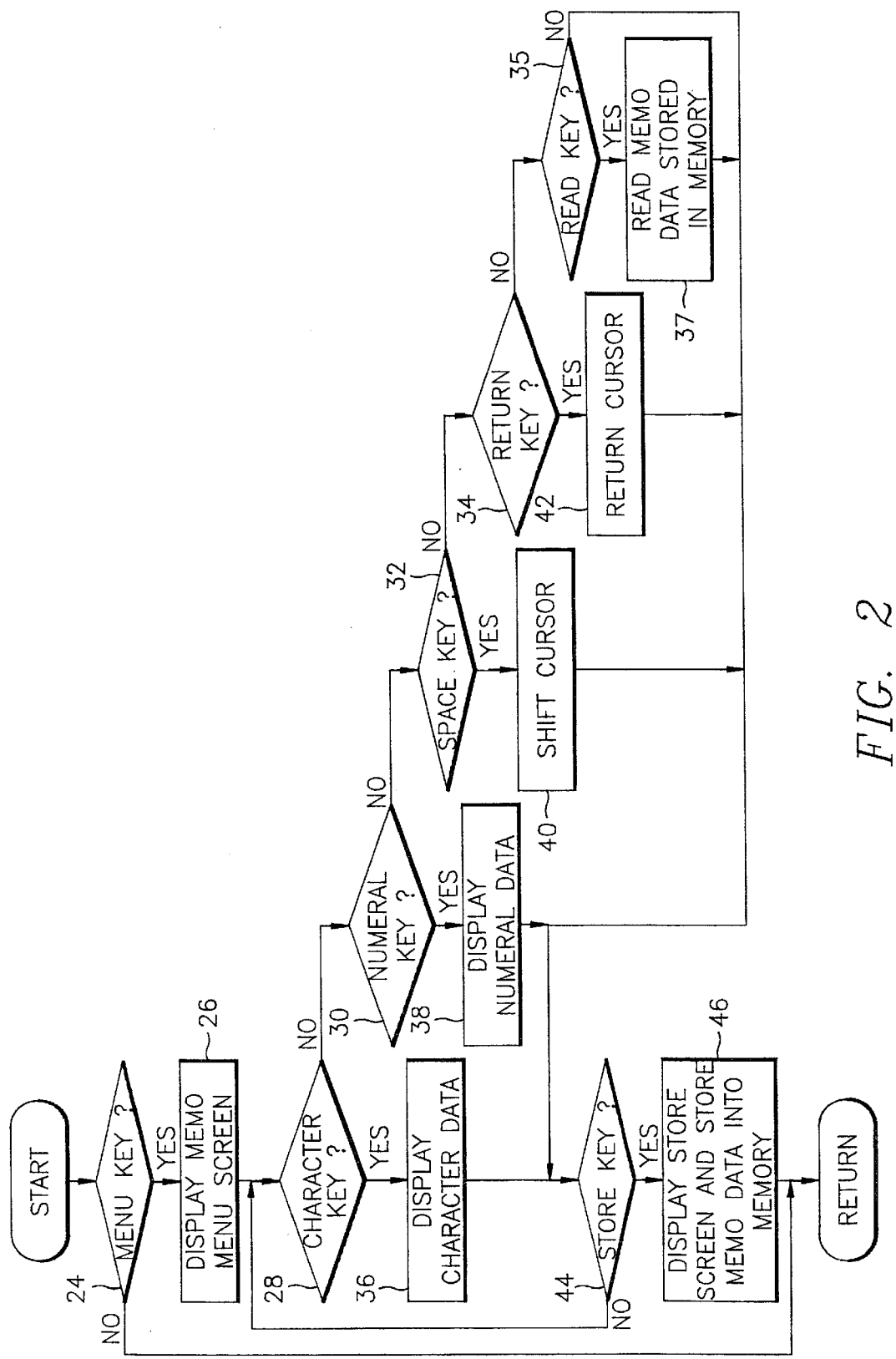
FIG. 2 is a flowchart of a preferred embodiment for performing a memo function according to the present invention.
Figure 3A:
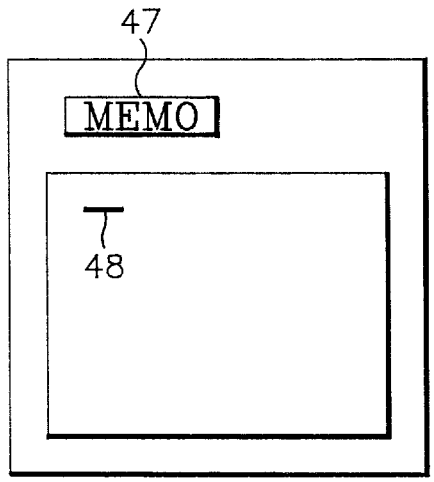
FIGS. 3A to 3D are diagrams showing memo display states of FIG. 2.

The operation of display system of FIG. 1 will now be described with reference to the flowchart of FIG. 2. The microprocessor 18 checks whether or not a menu key is applied to the microprocessor 18 by scanning an input port of the remote controller receiver 14 or key matrix 12 in step 24. If the memo key of the remote controller receiver 14 or key matrix 12 is depressed by a user, the microprocessor 18 determines that the menu key is applied thereto and produces a memo menu display control data to the OSD controller 20 so as to display a memo menu screen in step 26. The OSD controller 20 receiving the memo menu display control data generates a memo menu display signal and a cursor signal to the display unit 22. In this case, a memo menu screen 47 and a cursor 48 are displayed on the display unit 22 as shown in FIG. 3A. Through steps 28, 30, 32, 34 and 35, the microprocessor 18 checks whether or not input key data is a character, numeral, space, return or read key by scanning the input port of the remote controller receiver 14 and key matrix 12, respectively.

Figure 3B:
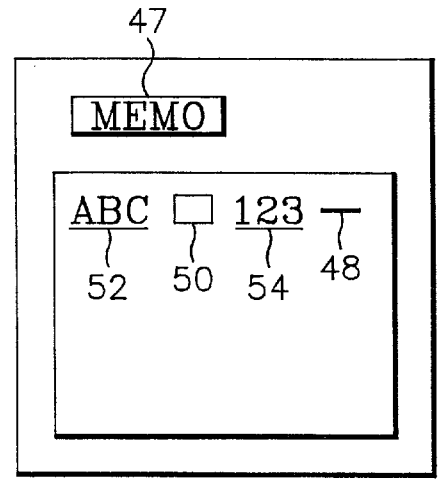
Figure 3C:
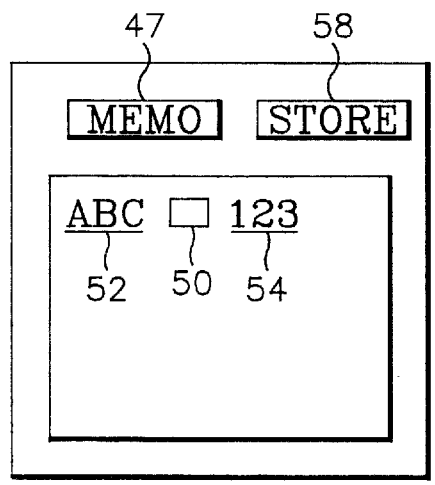

If the input key data is judged to be a character key in step 28, the microprocessor 18 generates character display control data corresponding to the character key to the OSD controller 20 so as to display character data on the display unit 22 in step 36. In this case, if the character key is continuously depressed, the cursor 48 is automatically shifted to the right side whenever one character is depressed, and then the cursor 48 returns to the first portion of a next line when one line is filled with the corresponding character data. In step 32, the microprocessor 18 checks whether or not a space key is depressed. If the space key is depressed in step 32, the cursor 48 is shifted to the right side in step 40. Thus, a space 50 is generated as shown in FIG. 3B. In step 44, the microprocessor 18 checks whether or not a store key is depressed. If step 44 determines that the store key is not depressed, the microprocessor 18 returns to step 28 to check whether the character key is applied thereto.

Figure 3D:
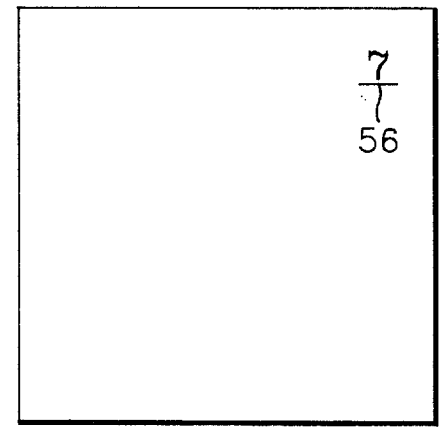

Moreover, a check is made to see if a numeral key, for example 0 to 9, is depressed in step 30. If the numeral key is depressed in step 30, the microprocessor 18 produces numeral display control data to the OSD controller 20 so as to display numeral data on the display unit 22 in step 38. For example, in the case that the user depresses numerals of 1, 2 and 3, the OSD controller 20 displays the numerals of 1, 2 and 3 generated from the microprocessor 18 on the display unit 22. Therefore, if the character, space and numeral keys 52, 50 and 54 are selected, a state shown in FIG. 3B is displayed on the display unit 22. Meanwhile, in step 44, the microprocessor 18 checks whether or not the store key is depressed. If step 44 determines that the store key is depressed, the microprocessor 18 displays a store screen 58 and stores the displayed memo data into the memory 16 in step 46. The memory 16 may be use a non-volatile EEPROM (Electrically Erasable Programmable Read Only Memory) or a RAM (Random Access Memory). After storing the displayed memo data, the microprocessor 18 turns off an OSD screen displayed on the display unit 22 by controlling the OSD controller 20, displays a previous channel number 56 as shown in FIG. 3D, and returns to a main routine (not shown).

In the state that the memo menu screen 47 indicated in FIG. 3A is displayed, if the user depresses a read key, the microprocessor 18 checks whether or not a read key data is applied thereto in step 35. Thereafter, the microprocessor 18 reads out data stored in the memory 16 and applies a read out data as a memo display control data to the OSD controller 20 in step 37. Then, the OSD controller 20 displays memo display data corresponding to the memo display control data generated from the microprocessor 18 on the display unit 22.

As described above, since memo functions are achieved in a display system with an OSD function, various display functions can be performed.

While preferred embodiments of the present invention have been particularly shown and described, it will be understood by those skilled in the art that foregoing and other changes in form and details may be made without departing from the spirit and scope of the present invention.

What is claimed is:

1. A method for performing a memo function in a display system with an on-screen display (OSD) function, comprising the steps of:

checking whether a menu key is selected;

displaying a memo menu screen when said step of checking whether said menu key is selected determines that said menu key is selected, and checking whether an input key is character, numeral, space, return, read or store key;

displaying character data or numeral data corresponding to character key or numeral key respectively, on a screen when said step of checking whether said input key is character, numeral, space, return, read or store key determines that said input key data is said numeral key or said character key;

shifting or returning a cursor to a right side or to a next line of said screen when said step of checking whether said input key is character, numeral, space, return, read or store key determines that said input key data is space key or return key;

reading out and displaying a memo data stored in a memory when said step of checking whether said input key is character, numeral, space, return, read or store key determines that said input key data is read key; and storing a displayed memo data into said memory when said step of checking whether said input key is character, numeral, space, return, read or store key determines that said input key data is store key.

2. An apparatus for performing a memo function in a display system with an on-screen display (OSD) function, comprising:

a key matrix having character and numeral keys for generating a key data corresponding to a depressed key;

a remote controller receiver means receiving a remote control signal generated from a remote controller to generate said remote control signal as an electrical signal;

controlling means for:

checking whether a menu key is selected;

displaying a memo menu screen when said step of checking whether said menu key is selected determines that said menu key is selected, and checking whether an input key is character, numeral, space, return, read or store key;

displaying character data or numeral data corresponding to character key or numeral key on a screen when said step of checking whether said input key is character, numeral, space, return, read or store key determines that said input key data is said numeral key or said character key;

shifting or returning a cursor to a right side or to a next line of said screen when said step of checking whether said input key is character, numeral, space, return, read or store key determines that said input key data is space key or return key;

reading out and displaying a memo data stored in a memory when said step of checking whether said input key is character, numeral, space, return, read or store key determines that said input key data is read key; and storing a displayed memo data in said memory when said step of checking whether said input key is character, numeral, space, return, read or store key determines that said input key data is store key;

an OSD controller means, from said controlling means, receiving display control data corresponding to said input key checked in said step of checking said input key is character, numeral, space, return, read or store key, and generating an OSD data in response to said display control data; and display means receiving and displaying said OSD data on said screen.

3. A process for performing a memo function on an on-screen display of a video signal upon a main screen, comprising the steps of:

checking whether a menu key is selected from a key matrix controlling said on-screen display;

displaying a memo menu screen upon said main screen if said menu key is selected;

displaying character data within said on-screen display upon said main screen when said menu key is a character key;

displaying numeral data within said on-screen display if said menu key is a numeral key;

shifting a cursor within said on-screen display from a left side to a right side if said menu key is a space key;

returning said cursor to a next line on the left side of said on-screen display if said menu key is a return key; and displaying a store screen upon said main screen and simultaneously storing menu data of said on-screen display onto a memory if said menu key is a store key.

4. The process of claim 3, further comprising the step of:

reading and displaying said memo data on said on-screen display stored in said memory if said menu key is a read key.

5. An apparatus for performing a memo function on an on-screen display of a main screen, comprising:

key matrix having a menu key representative of one of character, numeral, space, return, read and store keys;

receiver means responsive to a remote control signal generated from a remote controller, for generating a control signal;

control means for controlling performance of said memo function on said on-screen display, said controlling means checking whether a menu key is selected from a key matrix;

enabling a display of a memo menu screen within a main screen if said menu key is selected;

displaying character data on said on-screen display within said main screen when said menu key is a character key;

displaying numeral data on said on-screen display if said menu key is a numeral key;

shifting a cursor on said on-screen display from a left side to a right side if said menu key is a space key;

returning said cursor to a next line on the left side of said on-screen display if said menu key is a return key; and displaying a store screen within said main screen and simultaneously storing menu data of said on-screen display onto a memory if said menu key is a store key;

OSD controller means responsive to said controlling means, for generating on-screen display data in dependence upon said control signal; and display means having said main screen for displaying said on-screen display data.

6. The apparatus of claim 5, further comprised of said control means reading and displaying said memo data on said on-screen display stored in said memory if said menu key is a read key.

7. An apparatus for performing a memo function on an on-screen display within a main screen, comprising:

key matrix having a menu key representative of character, numeral, space, return, read and store key;

receiver means, responsive to a remote control signal generated from a remote controller, for generating a control signal;

control means for controlling performance of said memo function on said on-screen display in dependence upon said control signal, said controlling means comprising the steps of:

checking whether the menu key is selected from the key matrix;

providing a visual display of a memo menu screen separated from said on-screen display within the main screen if said menu key is selected;

providing a visual display of character data and numeral data on said on-screen display within said main screen when said menu key is a character key and a numeral key; shifting a cursor on said on-screen display from a left side to a right side if said menu key is a space key;

returning said cursor to a next line on the left side of said on-screen display if said menu key is a return key; and providing a visual display of a store screen separated from said memo menu screen and said on-screen display within said main screen and simultaneously storing menu data of said on-screen display onto a memory if said menu key is a store key;

on-screen display controller means responsive to said control means, for generating on-screen display data in dependence upon said control signal; and display means for displaying said on-screen display data on said on-screen display within said main screen.

8. The apparatus of claim 7, wherein said control means further comprises the step of reading out and displaying said memo data on said on-screen display stored in said memory if said menu key is a read key.

\* \* \* \* \*